US012801111B2

(12) United States Patent
Hamm et al.

(10) Patent No.: US 12,801,111 B2
(45) Date of Patent: Nov. 17, 2026

(54) METHOD AND DEVICE FOR VALIDATING A SET OF OPERATING PARAMETERS OF A MACHINE TOOL, IN PARTICULAR FOR A MILLING OPERATION

(71) Applicant: Airbus Operations (S.A.S.), Toulouse (FR)

(72) Inventors: Ivan Hamm, Toulouse (FR); Gérard Poulachon, Cluny (FR); Frédéric Rossi, Cluny (FR); Nicolas Maury, Toulouse (FR); Hélène Elias-Birembaux, Cluny (FR)

(73) Assignee: Airbus Operations (S.A.S.), Toulouse (FR)

( * ) Notice: Subject to any disclaimer, the term of this patent is extended or adjusted under 35 U.S.C. 154(b) by 383 days.

(21) Appl. No.: 18/524,401

(22) Filed: Nov. 30, 2023

(65) Prior Publication Data

US 2024/0201648 A1 Jun. 20, 2024

(30) Foreign Application Priority Data

Dec. 14, 2022 (FR) ....................................... 2213315

(51) Int. Cl.
*G05B 19/18* (2006.01)

(52) U.S. Cl.
CPC .. *G05B 19/182* (2013.01); *G05B 2219/37355* (2013.01)

(58) Field of Classification Search
CPC .................... G05B 19/182; G05B 2219/37355
See application file for complete search history.

(56) References Cited

U.S. PATENT DOCUMENTS 5,904,457 A 5/1999 Suwijn
2006/0246320 A1* 11/2006 Kathrein ................ C22C 14/00 204/298.13

(Continued)

FOREIGN PATENT DOCUMENTS

EP 3974104 A1 3/2022
JP 2022057746 A * 4/2022

OTHER PUBLICATIONS

Calleja A. et al, "Reliable Manufacturing Process in Turbine Blisks and Compressors," Procedia Engineering, Elsevier BV, vol. 63, Sep. 10, 2013 pp. 60-66.

(Continued)

*Primary Examiner* — Mark A Connolly
(74) *Attorney, Agent, or Firm* — KDW Firm PLLC

(57) ABSTRACT

A validation method includes a series of steps of acquiring a set of input data with a set of operating parameters, carrying out a reference milling operation of a first master workpiece and measuring values of the machining forces which are applied by a milling tool, determining specific force coefficients representative of the machining forces, carrying out an orthogonal cut of a second master workpiece and measuring values of the geometric sizes, calculating a tertiary thermal flux generated during the orthogonal cut, calculating a final temperature from the tertiary thermal flux, and comparing the final temperature with a critical temperature to validate or reject the set of operating parameters, the method enabling a temperature criterion to be established in a simple, rapid and low-cost manner to validate or reject the set of operating parameters to ensure the material health of a workpiece to be machined while maximizing the productivity.

9 Claims, 8 Drawing Sheets

(56) References Cited

U.S. PATENT DOCUMENTS

| | | | | |
|---|---|---|---|---|
| 2017/0342831 | A1* | 11/2017 | Weber | E21C 35/19 |
| 2020/0368871 | A1* | 11/2020 | Postel | G06F 18/214 |

OTHER PUBLICATIONS

Coz G. Le. et al, "Temperature variation in the workpiece and in the cutting tool when dry milling Inconel 718," The International Journal of Advanced Manufacturing Technology, vol. 74, No. 5, Jun. 22, 2014 pp. 1133-1139.

Rami et al, "Residual stresses computation induced by turning of AISI 4140 steel using 3D simulation based on a mixed approach," The International Journal of Advanced Manufacturing Technology, vol. 91, No. 9, Jan. 30, 2017 pp. 3833-3850.

Figueiredo Alisson et al, "Heat flux in machining processes: a review," The International Journal of Advanced Manufacturing Technology, vol. 120, No. 5-6, Mar. 5, 2022, pp. 2827-2848.

French Search Report for Application No. 2213315 dated Aug. 7, 2023.

* cited by examiner

METHOD AND DEVICE FOR VALIDATING A SET OF OPERATING PARAMETERS OF A MACHINE TOOL, IN PARTICULAR FOR A MILLING OPERATION

TECHNICAL FIELD

The disclosure herein relates to a method and device for validating a set of operating parameters of a machine tool, in particular for a milling operation.

BACKGROUND

During machining of a workpiece, physical phenomena, also known as a loading conditions, which are capable of changing the mechanical characteristics of the machined workpiece may be involved. These loading conditions are dependent in particular on the machining parameters. For example, a machining with parameters which involve significant deformations, significant deformation speeds or significant temperature gradients may render the machined workpiece fragile by reducing the mechanical strength thereof, in particular its fatigue limit.

In specific fields, in particular in aeronautics, very high speed methods (high-speed machining) with significant pass depths are often used for reasons of production cost. This type of method may involve significant loading conditions. Furthermore, aeronautical components may be costly to produce (complex shapes, significant sizes, costly material) and may have safety issues which makes their mechanical integrity particularly important. It is therefore necessary to quantify the loading conditions in order to be able to estimate the effects of a machining operation on the material health of a workpiece to be machined.

The loading conditions comprise mechanical loads (forces, pressures) and thermal loads (thermal fluxes, temperatures). It is known, for example, that, when machining a workpiece, an excessively high temperature brought about in the region of the machined surface creates residual stresses which are detrimental to the fatigue service-life of the workpiece. If there are methods for limiting the temperature in the region of the machined surfaces (injection of cooling fluid, etc.), there is, on the other hand, no solution for estimating this temperature prior to the machining. In particular, there is no solution which enables it to be known whether the machining parameters will generate a loading condition which may or may not be detrimental to the material health of a workpiece to be machined.

SUMMARY

An object of the disclosure herein is to disclose a solution for overcoming the above-mentioned disadvantage. It relates to a method for validating a set of operating parameters of a machine tool, in particular for a milling operation.

According to the disclosure herein, the validation method comprises at least the following series of steps:

- an acquisition step which involves acquiring a set of input data comprising at least:
  - a set of operating parameters to be validated, comprising parameters which are linked to the machine tool and parameters which are linked to the milling tool; and
  - a set of additional parameters relating to features of the milling tool and the workpiece to be machined;
- a milling step which involves producing, using the milling tool, at least one reference milling of a first master workpiece which is representative of the workpiece to be machined, and measuring the values of the machining forces which are applied by the milling tool to the first master workpiece;
- a first data-processing step which involves determining, from at least some data of the set of input data and the values of the machining forces measured in the milling step, specific force coefficients which are representative of the machining forces;
- an orthogonal cutting step which involves carrying out, using the milling tool, at least one orthogonal cut of a second master workpiece which is representative of the workpiece to be machined, and measuring at least the values of geometric sizes which are linked to a reference chip which is generated during the orthogonal cut; and
- a second data-processing step comprising at least:
  - a first calculation sub-step which involves calculating, from at least some data of the set of input data, at least one of the specific force coefficients and the values of the geometric sizes measured in the orthogonal cutting step, a so-called tertiary thermal flux which is generated in a so-called tertiary shearing zone of the second master workpiece during the orthogonal cut;
  - a second calculation sub-step which involves calculating, from the tertiary thermal flux, a so-called final temperature which is representative of the maximum temperature in the region of a machined surface of the second master workpiece during the orthogonal cut; and
  - a comparison sub-step which involves comparing the final temperature with a so-called critical temperature and:
    - rejecting the set of operating parameters if the final temperature is greater than or equal to the critical temperature; and
    - validating the set of operating parameters if the final temperature is lower than the critical temperature.

In this manner, according to the disclosure herein, a method is provided which enables the temperature generated in the region of a surface of a workpiece which it is desirable to machine to be estimated in a simple, rapid and low-cost manner during a milling operation. This information enables the set of operating parameters used to be rejected or validated in order to carry out the milling operation in accordance with a simple criterion which corresponds to a critical temperature threshold which should not be exceeded. It is then possible to adapt the set of operating parameters in order to ensure the material health of the workpiece which is intended to be machined whilst maximizing productivity.

The term "ensure the material health" is intended to be understood to mean avoiding any actions which have the effect of modifying a workpiece in the region of at least one topographic parameter (roughness, surface discontinuity, burning, etc.), at least one microstructural state (grain size, plastic deformations, phase fractions, etc.) or at least one mechanical property (residual constraints, hardness, fatigue limit, for example, at $10^5$ cycles, etc.), beyond a predetermined limit.

The term "maximize the productivity" is intended to be understood to mean maximizing at least a service-life of the milling tool and/or a chip flow rate generated by the milling tool during a machining operation.

Advantageously, the set of operating parameters comprises at least some of the following operating parameters:

- an advance speed of the milling tool;
- a rotation frequency of the milling tool;
- a cutting speed of the milling tool;
- an advance per tooth of the milling tool;

- a radial engagement of the milling tool;
- an axial engagement of the milling tool;
- a diameter of the milling tool;
- a number of teeth of the milling tool;
- a helix angle of the milling tool;
- a cutting angle of the cutting edges of the milling tool;
- a clearance angle of the cutting edges of the milling tool;
- a sharpness radius of the cutting edges of the milling tool; and
- a clearance wear of the cutting edges of the milling tool.

Furthermore, the first data-processing step advantageously comprises:

- an analytical calculation sub-step which involves determining, from a kinematic model of the reference milling carried out in the milling step, mathematical expressions of the theoretical machining forces as a function of the specific force coefficients; and
- an identification sub-step which involves identifying the specific force coefficients by minimizing the deviations between the values of the machining forces measured in the milling step and the theoretical machining forces.

Furthermore, the orthogonal cutting step advantageously involves measuring the values of at least some of the following geometric sizes:

- an inclination angle of the primary shearing plane;
- a chip contact length on the cutting face;
- a clearance contact length; and
- a mean thickness of the cut chip.

In a specific embodiment, the method involves a third data-processing step which is implemented after the second data-processing step if the final temperature is lower than the critical temperature, the third data-processing step comprising:

- a third calculation sub-step which involves calculating, from at least some data of the set of input data and values of the geometric sizes measured in the orthogonal cutting step, a so-called primary thermal flux which is generated in a so-called primary shearing zone of the second master workpiece, and a so-called secondary thermal flux which is generated in so-called secondary shearing zone of the second master workpiece;
- a fourth calculation sub-step which involves calculating, from the primary thermal flux and the secondary thermal flux, a so-called total temperature which is representative of the maximum temperature in the region of a machined surface of the second master workpiece during the orthogonal cut; and
- a comparison sub-step which involves comparing the total temperature with the critical temperature, and:
- rejecting the set of operating parameters if the total temperature is greater than or equal to the critical temperature; and
- validating the set of operating parameters if the total temperature is lower than the critical temperature.

The disclosure herein also relates to a device for validating the set of operating parameters of the machine tool which comprises the milling tool and which is intended to carry out a milling operation of the workpiece to be machined.

According to the disclosure herein, the device comprises at least:

- an acquisition unit which is configured to receive a set of input data comprising at least:
- a set of operating parameters to be validated, comprising parameters which are linked to the machine tool and parameters which are linked to the milling tool; and
- a set of additional parameters relating to features of the milling tool and the workpiece to be machined;
- a first data-processing unit which is configured to determine, from the set of input data and values of the machining forces, specific force coefficients which are representative of the machining forces, the values of the machining forces corresponding to force values applied by the milling tool to a first master workpiece, which is representative of the workpiece to be machined, during a reference milling operation of the first master workpiece;
- a second data-processing unit which is configured:
- to calculate, from at least some data of the set of input data, at least one of the specific force coefficients and values of the geometric sizes, a so-called tertiary thermal flux which is generated in a so-called tertiary shearing zone, the values of the geometric sizes corresponding to values which are linked to a reference chip of a second master workpiece which is generated by the milling tool during an orthogonal cut of the second master workpiece;
- to calculate, from the tertiary thermal flux, a so-called final temperature which is representative of the maximum temperature in the region of a machined surface of the second master workpiece during the orthogonal cut; and
- to compare the final temperature with a so-called critical temperature and:
- to reject the set of operating parameters if the final temperature is greater than or equal to the critical temperature; and
- to validate the set of operating parameters if the final temperature is lower than the critical temperature.

In a specific embodiment, the device comprises a third data-processing unit which is configured:

- to calculate, from at least some data of the set of input data and the values of the geometric sizes measured during the orthogonal cut, a so-called primary thermal flux which is generated in a so-called primary shearing zone of the second master workpiece, and a so-called secondary thermal flux which is generated in a so-called secondary shearing zone of the second master workpiece;
- to calculate, from the primary thermal flux and the secondary thermal flux, a so-called total temperature which is representative of the maximum temperature in the region of a machined surface of the second master workpiece during the orthogonal cut; and
- to compare the total temperature with the critical temperature and:
- to reject the set of operating parameters if the total temperature is greater than or equal to the critical temperature; and
- to validate the set of operating temperatures if the total temperature is lower than the critical temperature.

Furthermore, the device advantageously comprises a dynamometric plate which is configured to measure the values of the machining forces during the reference milling of the first master workpiece.

Furthermore, the device advantageously comprises a measurement unit which is configured to carry out optical measurements of the geometric sizes during the orthogonal cut of the second master workpiece.

BRIEF DESCRIPTION OF THE DRAWINGS

The appended Figures will provide a good understanding of how the disclosure herein can be implemented. In the Figures, the identical reference numerals denote similar elements.

DETAILED DESCRIPTION

Figure 2:
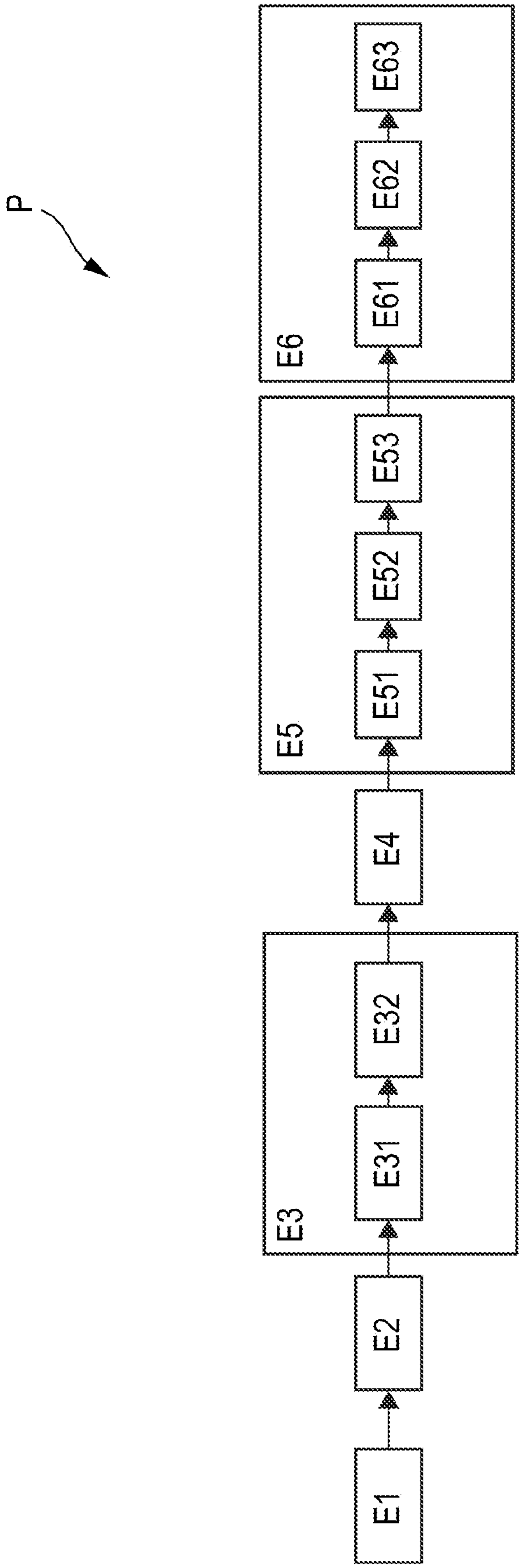
FIG. 2 shows a block diagram of a specific embodiment of a method for validating a set of operating parameters of a machine tool.

The validation device 1 (device 1 below) which enables the disclosure herein to be illustrated and which is illustrated in a specific embodiment in FIG. 2 is implemented on a machine tool (not illustrated), for example, a numerically controlled machine tool (CNC). The machine tool comprises a milling tool 2 which is illustrated schematically from FIG. 2 to FIG. 11 and by which it carries out conventional milling operations on a workpiece 4 to be machined. These may be varied milling operations, for example, a milling operation with a contouring configuration. In order to shape the workpiece 4 to be machined, the machine tool needs to be configured or programmed with a set of operating parameters 3 which enables the desired milling operations to be carried out. The set of operating parameters 3 comprises, in particular, parameters which are linked to the machine tool and parameters which are linked to the milling tool 2.

The device 1 enables the effects brought about by a milling operation using the set of operating parameters 3 on the workpiece 4 to be machined to be estimated and enables conclusions to be drawn regarding the acceptability of the set of operating parameters 3. More specifically, it enables the set of operating parameters 3 to be rejected or validated depending on whether it is capable or not of bringing about a milling which impacts the material health of the workpiece 4 to be machined. The criterion which enables the set of operating parameters 3 to be validated or not is the temperature generated by a milling in the region of a machined surface 5 of the workpiece 4 to be machined.

Figure 3:
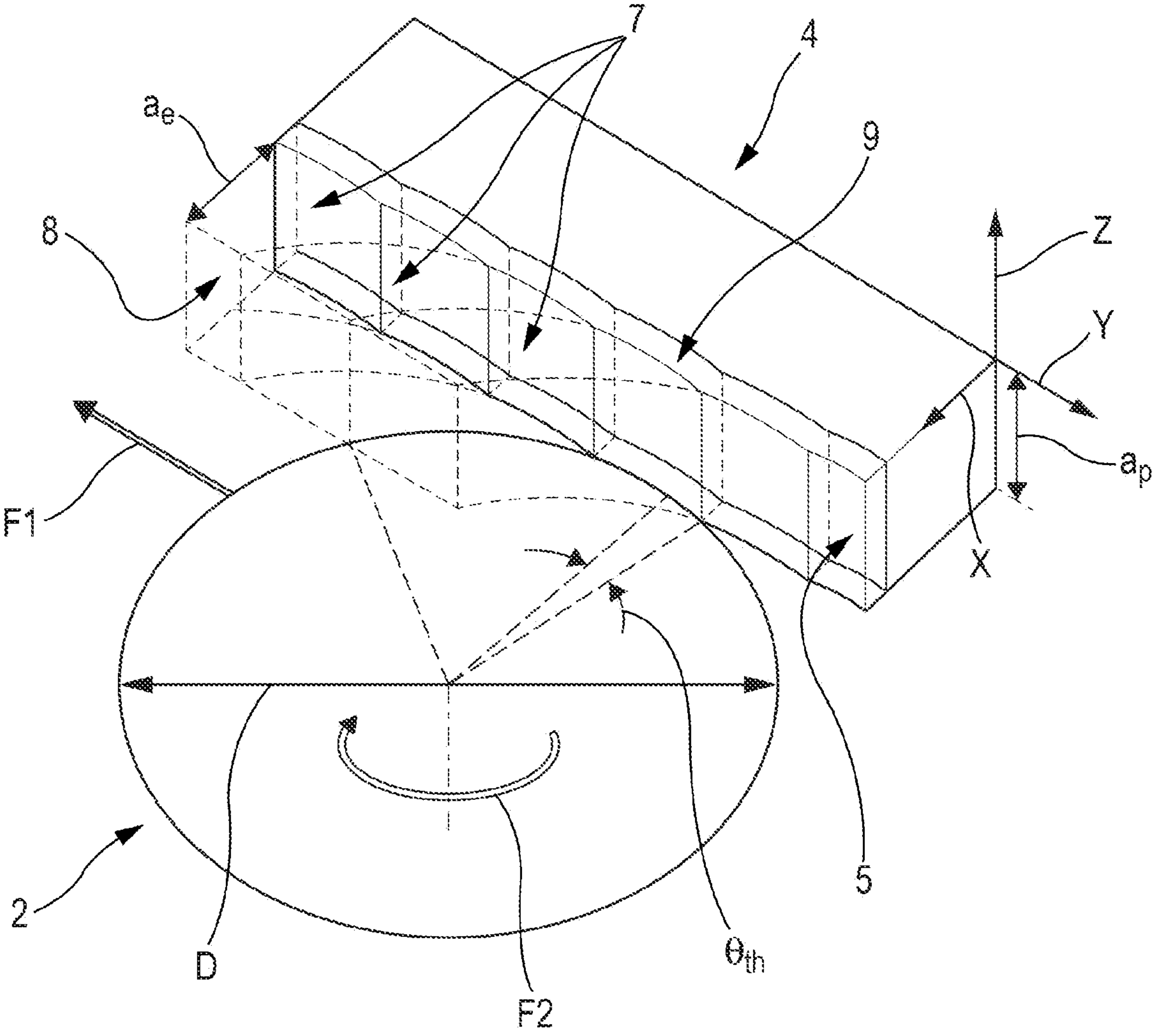
FIG. 3 shows a schematic, perspective, anamorphic view of a milling tool which carries out a milling of a workpiece to be machined.
Figure 4:
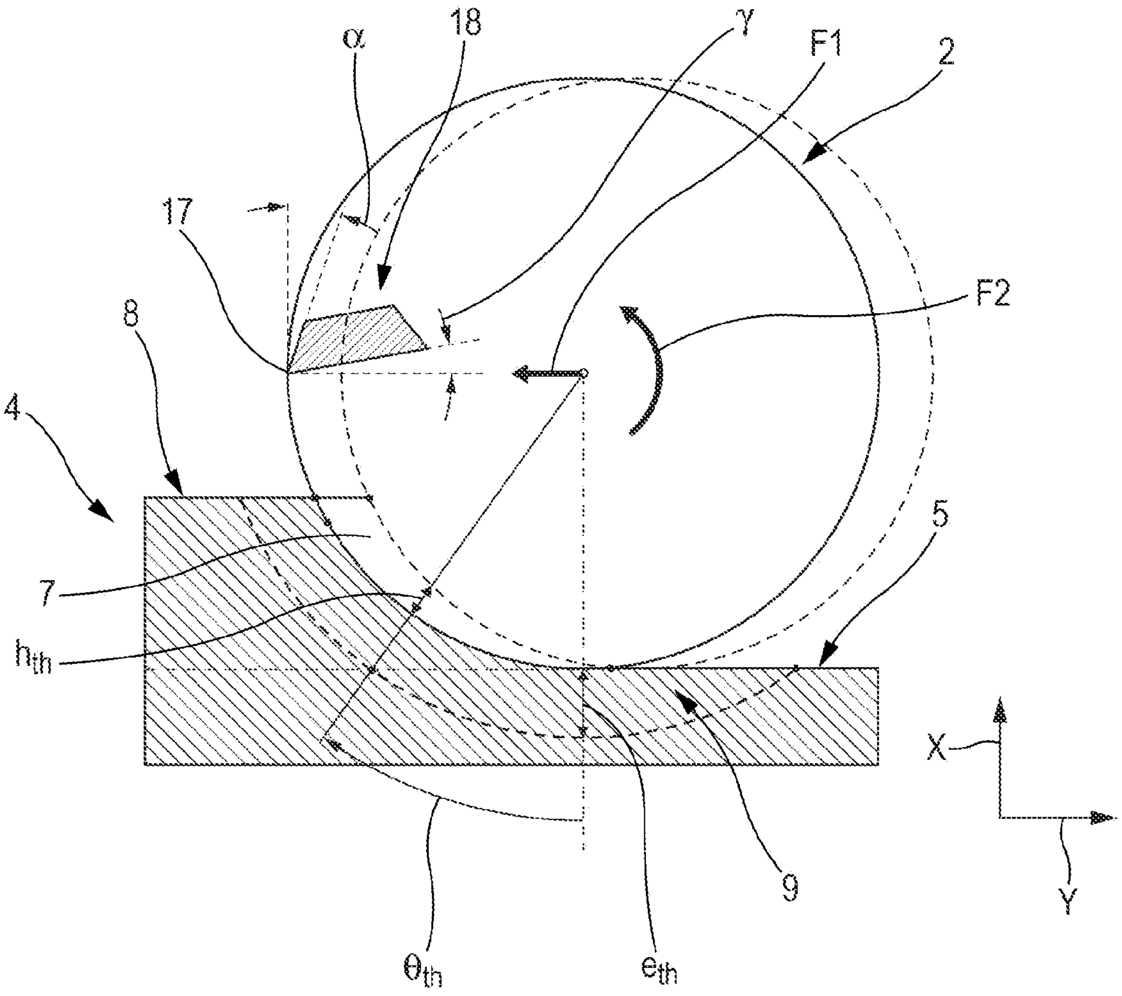
FIG. 4 shows a schematic view of FIG. 3 in cross section of the milling tool of FIG. 3 machining the workpiece to be machined.

This is because, as illustrated in FIG. 3 and FIG. 4, during the milling operation, the milling tool 2 removes portions of materials corresponding to chips 7 on a face 8 of the workpiece 4 to be machined in order to obtain the machined surface 5. This removal of material has, in particular, the effect of generating heat (or a thermal load) in the region of the machined surface 5 in a so-called thermal zone 9 which corresponds to a surface layer of the workpiece 4 which is thermally affected by the milling. Beyond a specific temperature value obtained in this thermal zone 9, the thermal loading brings about the appearance of residual stresses in the region of the machined surface 5, in particular residual tensile stresses which are detrimental to the material health of the workpiece 4 to be machined.

The device 1 enables the temperature obtained in the region of the machined surface 5 of the workpiece 4 to be machined to be estimated during a milling operation using the set of operating parameters 3, and enables conclusions to be drawn from this as to whether or not this milling operation is detrimental to the material health of the workpiece 4 to be machined. Preferably, it enables the maximum temperature obtained in the region of the machined surface to be estimated during a milling operation. By extension, it thus enables the set of operating parameters 3 to be validated or not, as explained in detail in the remainder of the description. However, this estimation must be carried out prior to the milling of the workpiece 4 to be machined. Therefore, in order to carry out this estimation, the device 1 uses master workpieces 4A and 4B for carrying out experimental measurements which are used to validate or not the set of operating parameters 3.

In the context of the disclosure herein, the master workpieces 4A and 4B refer to workpieces which are made from the same material as that of the workpiece 4 to be machined and which are representative of the workpiece 4 to be machined. The term "representative" is intended to be understood to mean that they have at least the same properties and mechanical characteristics as the workpiece 4 to be machined. Furthermore, as described below in the description, the device 1 uses a first master workpiece 4A in order to carry out a first operation (a reference milling operation) and a second master workpiece 4B in order to carry out a second operation (an orthogonal cut). These two operations are independent of each other and the master workpieces 4A and 4B may correspond to separate workpieces or to the same workpiece on which these two operations would be carried out.

In a preferred embodiment, the workpiece 4 to be machined is made from metal material, for example, from steel or aluminum. Preferably, it is a workpiece made from titanium, for example, a workpiece made from the alloy Ti-6Al-4V αβ. Furthermore, the milling tool 2 corresponds to a conventional tool which is adapted to carry out milling operations on metal workpieces, more specifically on titanium workpieces. For example, it may be a milling cutter made of high-speed steel, a milling cutter made of monobloc carbide or carbide plates, a CBN milling cutter ("Cubic Boron Nitride"), a ceramic milling cutter or a diamond milling cutter.

Figure 1:
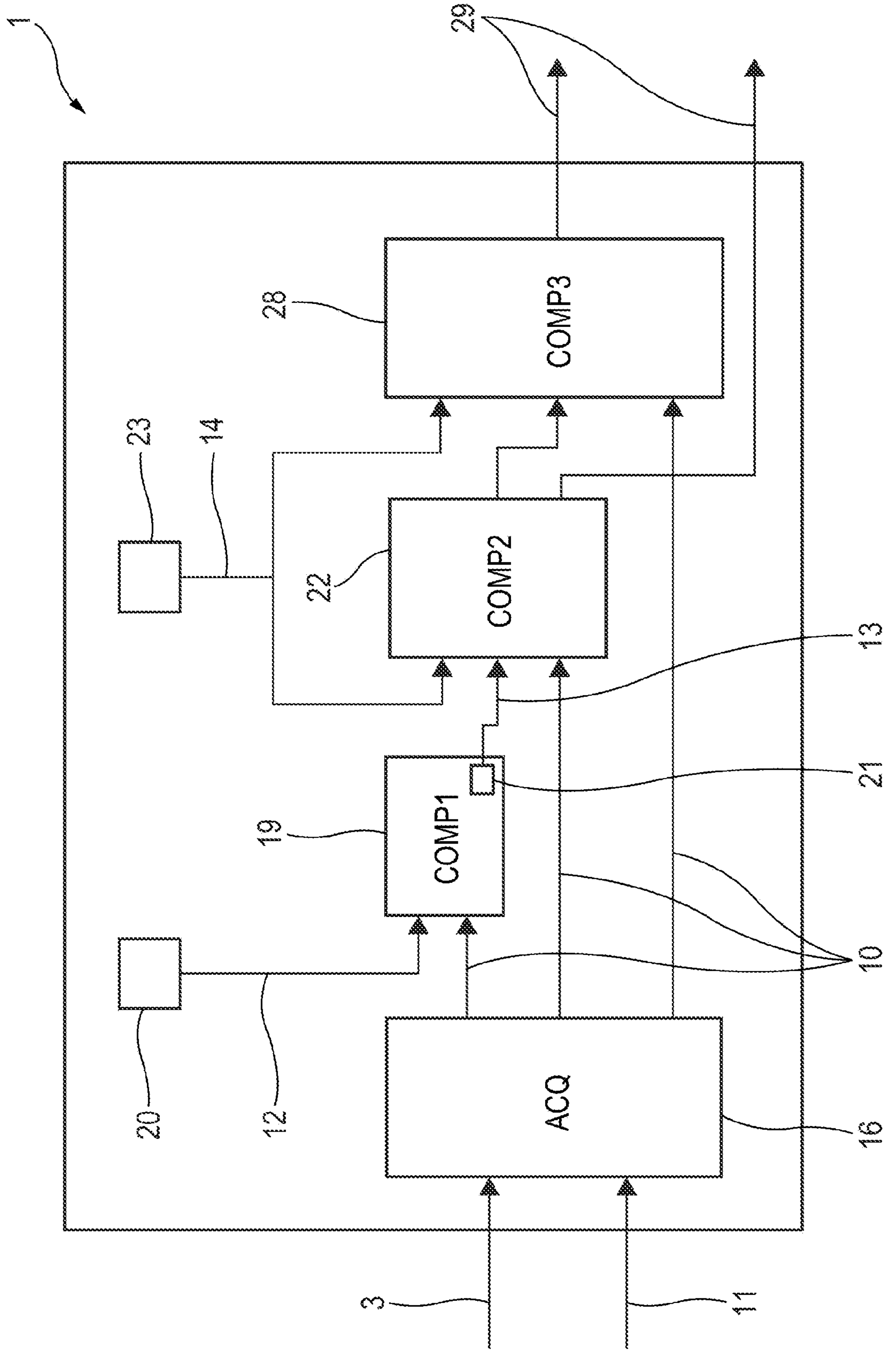
FIG. 1 shows a schematic view of a specific embodiment of a device for validating a set of operating parameters of a machine tool.

The device 1 which is illustrated schematically in FIG. 1 enables a method P for validation of the set of operating parameters 3 of the machine tool which is schematically illustrated in FIG. 2 to be implemented. As described in the remainder of the description, the device 1 comprises a plurality of units which are capable of implementing the method P in a software-related manner, for example, using conventional processors of the microprocessor type.

The method P comprises the series of steps E1 to E5 below, the implementation of which by the device 1 will be set out in greater detail in the remainder of the description. Preferably, these steps are carried out successively. In specific embodiments, however, the order of the steps may vary.

The method P comprises, initially, an acquisition step E1. This acquisition step E1 involves acquiring a set of input data 10 which comprises at least the set of operating parameters 3 and validating a set of additional parameters 11 relating to features of the milling tool 2 and the workpiece 4 to be machined.

Figure 8:
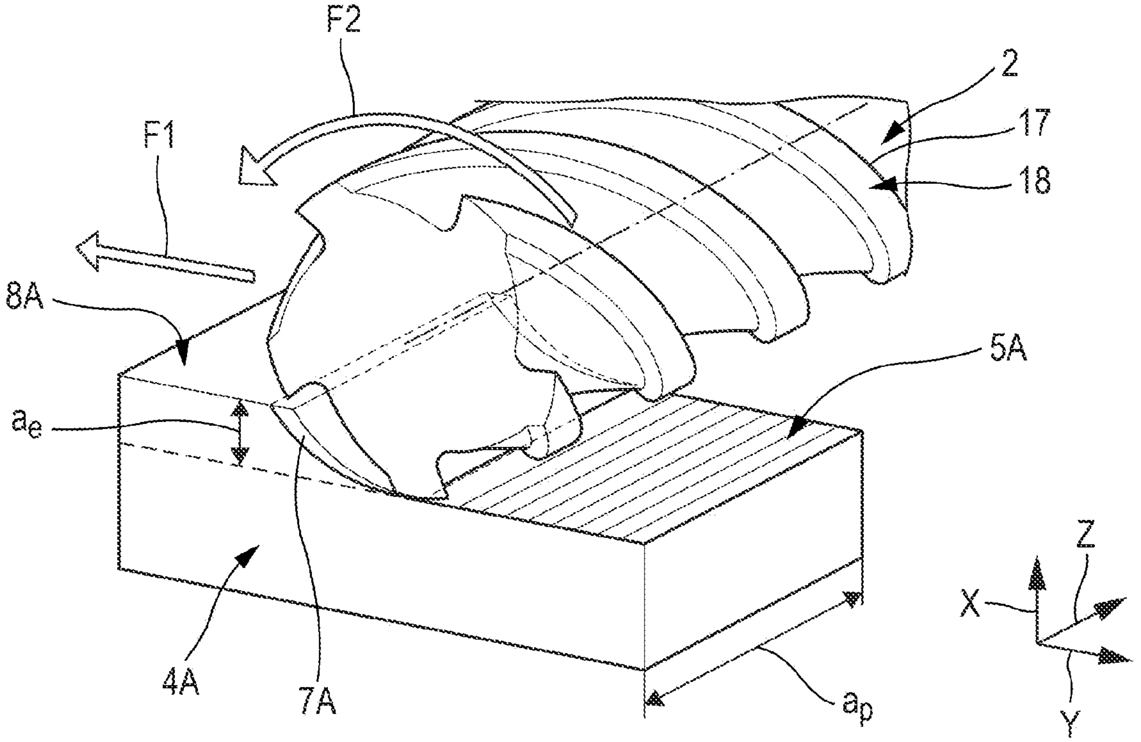
FIG. 8 shows a schematic, perspective view of a reference milling of a first master workpiece showing the machining forces applied by the milling tool to the first master workpiece.

The method P also comprises a milling step E2. This milling step E2 involves carrying out, using the milling tool 2, a reference milling of the master workpiece 4A which is illustrated in FIG. 8. This reference milling enables the values of the machining forces 12 applied by the milling tool 2 to the master workpiece 4A to be measured.

The method P further comprises a first data-processing step E3. This data-processing step E3, which is implemented after the reference milling operation, involves determining specific force coefficients 13 which are representative of the machining forces 12 measured in the milling step E2. These specific force coefficients are determined based on at least some data from the set of input data 10 and the values of the machining forces 12. This determination is set out in detail in the remainder of the description.

Figure 9:
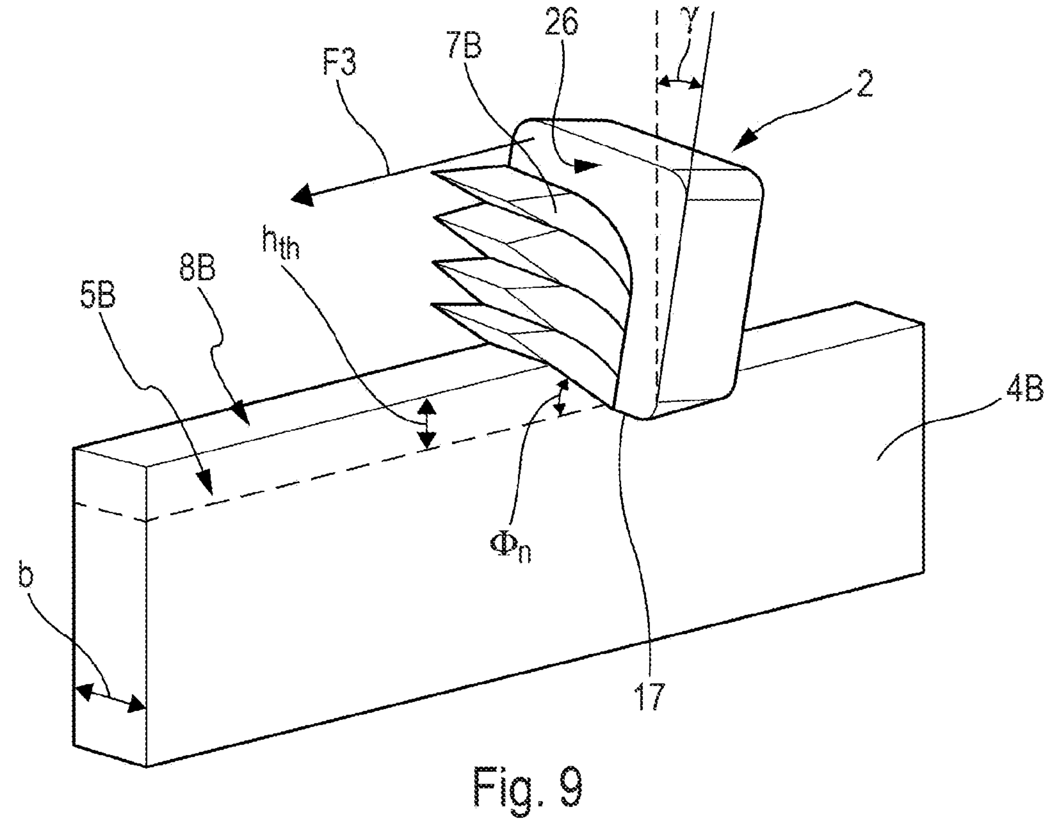
FIG. 9 shows a perspective view of the milling tool carrying out an orthogonal cut of a second master workpiece.
Figure 10:
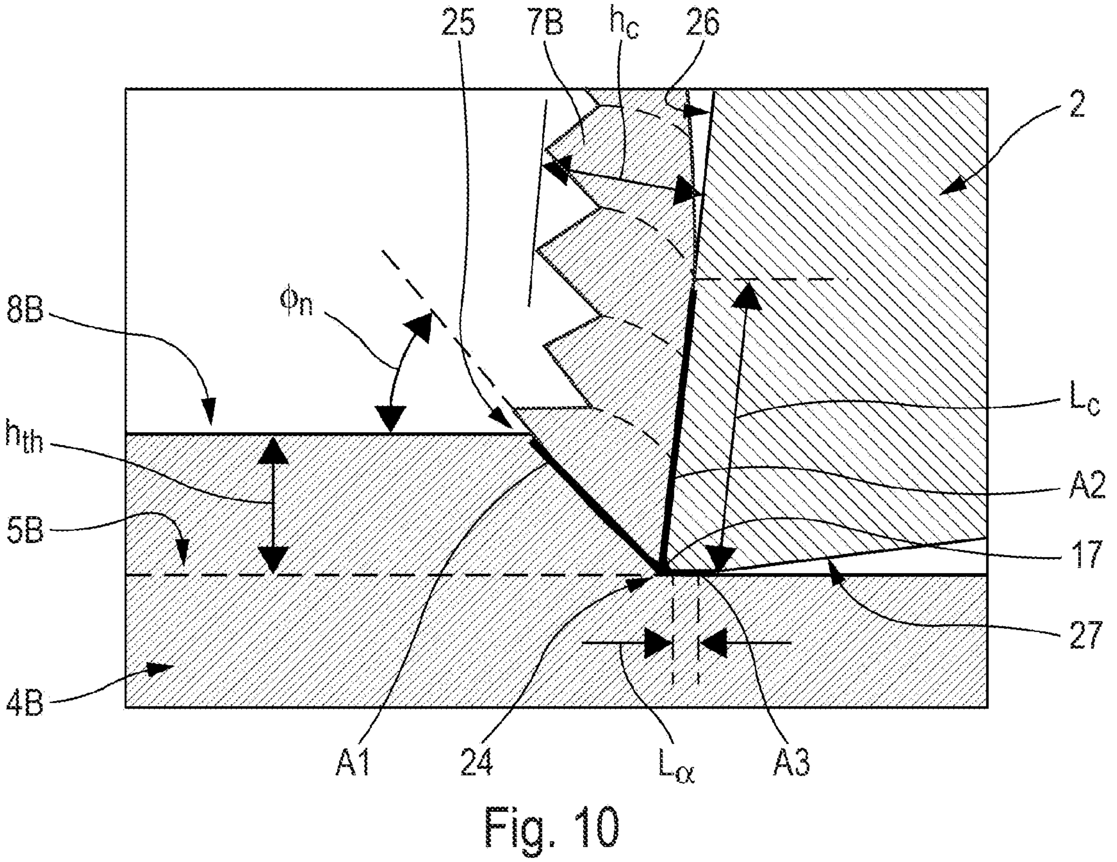
FIG. 10 shows a cross section of the milling tool of FIG. 9.
Figure 11:
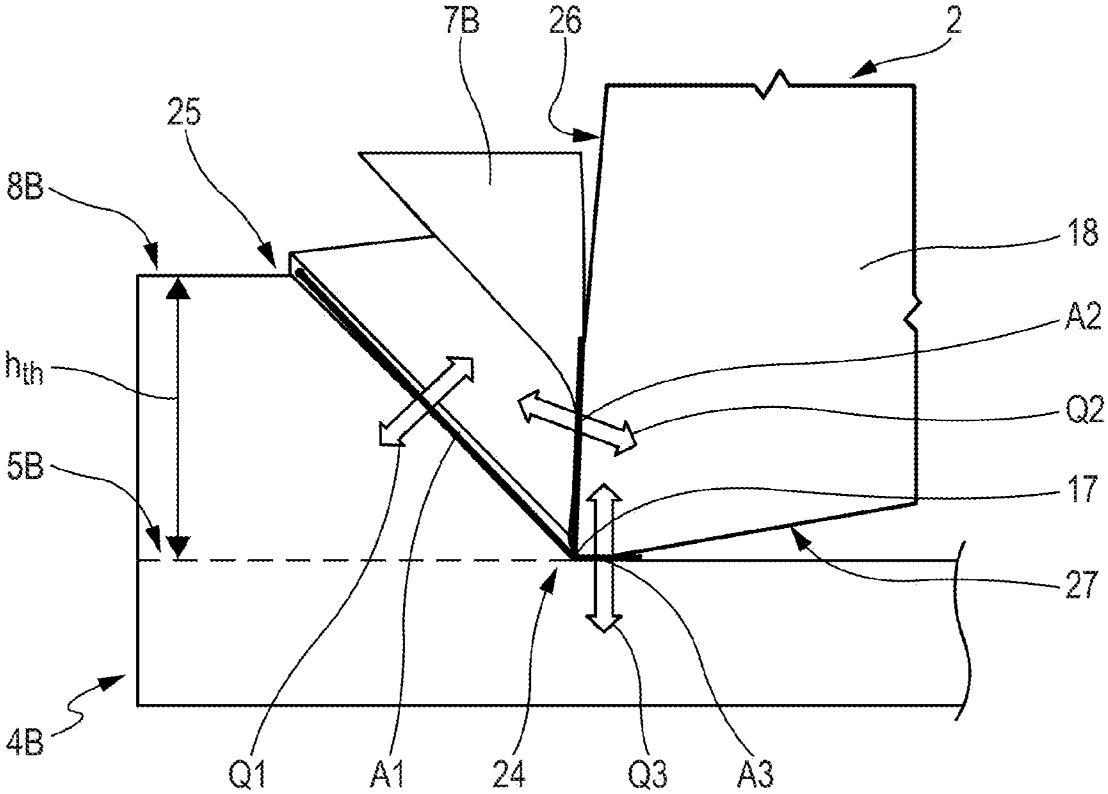
FIG. 11 shows a schematic view of the view of FIG. 10 showing thermal fluxes generated during the orthogonal cut of the second master workpiece.

The method P further comprises an orthogonal cutting step E4 illustrated from FIG. 9 to FIG. 11. This orthogonal cutting step E4 involves producing, using the milling tool 2, an orthogonal cut of the master workpiece 4B. It also involves measuring the values of the geometric sizes 14 which are linked to a reference chip 7B generated in the master workpiece 4B during the orthogonal cut. These geometric sizes 14 are explained in the remainder of the description.

The method P also comprises a second data-processing step E5. This second data-processing step E5, which is implemented after the orthogonal cut, comprises the following sub-steps E51, E52 and E53.

A first calculation sub-step E51 involves calculating a tertiary thermal flux $Q_\alpha$ which is generated in a so-called tertiary shearing zone A3 of the master workpiece 4B during the orthogonal cut. This tertiary thermal flux $Q_\alpha$ is calculated from at least some data from the set of input data 10 and values of the geometric sizes 14 which are measured during the orthogonal cut in the orthogonal cutting step E4. This calculation is set out in detail in the remainder of the description.

A second calculation sub-step E52 involves calculating, from the tertiary thermal flux $Q_\alpha$, a final temperature $T_f$. This final temperature $T_f$ is representative of the temperature in the region of a machined surface 5B of the master workpiece 4B during the orthogonal cut. By extension, it is also representative of the temperature in the region of the machined surface 5 of the workpiece 4 to be machined during a milling operation. This temperature which varies over time is calculated in accordance with the cutting time, that is to say, the time during which the milling tool 2 machines the master workpiece 4A. It is then possible to extract therefrom the maximum temperature obtained in the region of the machined surface 5B which is the significant temperature to be taken into account as a criterion. The calculation of the final temperature $T_f$ is set out in detail in the remainder of the description.

A comparison sub-step E53 involves comparing the final temperature $T_f$ with a critical temperature $T_c$. This critical temperature $T_c$ corresponds to a temperature from which it is considered that the material health of the workpiece 4 to be machined is degraded if it is reached in the region of the machined surface 5. For example, it may be a temperature from which residual stresses begin to be induced in the workpiece 4 to be machined by a thermal load brought about by a milling operation.

If the final temperature $T_f$ is greater than or equal to the critical temperature $T_c$, the set of operating parameters 3 is thus rejected. If the final temperature $T_f$ is lower than the critical temperature $T_c$, the set of operating parameters 3 is thus validated.

The term "validated" is intended to be understood to mean that the set of operating parameters 3 is considered to be satisfactory, that is to say, it does not bring about a milling which is detrimental to the material health of the workpiece 4 to be machined. Consequently it is recorded, for example, in a memory in order to be able to be subsequently used.

The term "rejected" is intended to be understood to mean that the set of operating parameters 3 is considered to be unsatisfactory, that is to say, it is capable of bringing about a milling which is detrimental to the material health of the workpiece 4 to be machined. The set of operating parameters 3 can thus simply not be recorded or can be recorded, for example, in a memory, and designated as being unsatisfactory.

In this manner, using the method P, it is possible to estimate in a simple, rapid and low-cost manner the temperature generated on the workpiece 4 to be machined in the region of the machined surface 5, during a milling operation. This information item enables the set of operating parameters 3 used to carry out the milling operation to be validated or rejected in accordance with a simple criterion which corresponds to a critical temperature threshold which should not be exceeded. It is then possible to adapt the set of operating parameters 3 in order to ensure that the material health of the workpiece 4 to be machined is not degraded by the milling operation whilst maximizing the productivity of the milling operation.

In a specific embodiment, the method P further comprises a third data-processing step E6 which is carried out after the data-processing step E5 if the final temperature $T_f$ is lower than the critical temperature $T_c$. In this specific embodiment, it is considered that the set of operating parameters 3 is not completely validated after the data-processing step E5 and it is necessary to estimate more precisely the temperature obtained in the region of the machined surface 5B. To this end, it comprises the following sub-steps E61, E62, E63 which enable a more precise estimation to be carried out and a second validation or a rejection of the set of operating parameters 3 to be carried out.

A third calculation sub-step E61 involves calculating a primary thermal flux $Q_s$ which is generated in a so-called primary shearing zone A1 of the master workpiece 4B and a secondary thermal flux $Q_\gamma$ which is generated in a secondary shearing zone A2 of the master workpiece 4B. This calculation is carried out on the basis of at least some data from the set of input data 10 and values of the geometric sizes 14 measured during the orthogonal cut. It is set out in detail in the remainder of the description.

A fourth calculation sub-step E62 involves calculating, from the primary thermal flux $Q_s$ and the secondary thermal flux $Q_\gamma$, a total temperature $T_t$ which is representative of the maximum temperature in the region of a machined surface 5B of the master workpiece 4B during the orthogonal cut. This total temperature $T_t$ corresponds to a more precise estimate of the temperature in the region of the machined surface 5B since its calculation takes into account, in addition to the tertiary thermal flux $Q_\alpha$, the primary thermal flux $Q_s$ and the secondary thermal flux $Q_\gamma$. This calculation is set out in detail in the remainder of the description.

A comparison sub-step E63 involves comparing the total temperature $T_t$ with the critical temperature $T_c$. If the total temperature $T_t$ is greater than or equal to the critical temperature $T_c$, this set of operating parameters 3 is thus rejected. If the total temperature $T_t$ is lower than the critical temperature $T_c$, the set of operating parameters 3 is thus validated.

The device 1 comprises an acquisition unit 16 (designated ACQ in FIG. 1) which enables the acquisition step E1 to be implemented. These may be conventional elements (not illustrated) which enable an operator to teach data, for example, a keyboard and a display screen or a touch screen. This acquisition unit 16 is configured to receive all of the input data 10 which comprise the set of operating parameters 3 to be validated and the set of additional parameters 11.

$FSv_cf_za_ea_p$ In a non-limiting manner, the set of operating parameters 3 may comprise the following parameters, linked to the kinematics of the milling tool 2:

- $FSv_cf_za_ea_p$—an advance speed of the milling tool 2;
- $FSv_cf_za_ea_p$—a rotation frequency of the milling tool 2;
- $FSv_cf_za_ea_p$—a cutting speed of the milling tool 2;
- $FSv_cf_za_ea_p$—an advance per tooth of the milling tool 2;
- $FSv_cf_za_ea_p$—a radial engagement of the milling tool 2; and
- $FSv_cf_za_ea_p$—an axial engagement of the milling tool 2.

$D\lambda\gamma\alpha r_\beta$ Still in a non-limiting manner, the set of operating parameters 3 may comprise the following parameters which are linked to the geometry of the milling tool 2 and the cutting edges 17 of teeth 18 with which the milling tool is provided (FIG. 6 and FIG. 7):

- $D\lambda\gamma\alpha r_\beta$—a diameter of the milling tool 2;
- $D\lambda\gamma\alpha r_\beta$—a number of teeth of the milling tool 2;
- $D\lambda\gamma\alpha r_\beta$—a helix angle of the milling tool 2;
- $D\lambda\gamma\alpha r_\beta$—a cutting angle of the cutting edges 17 of the milling tool 2;
- $D\lambda\gamma\alpha r_\beta$—a clearance angle of the cutting edges 17 of the milling tool 2;
- $D\lambda\gamma\alpha r_\beta$—a sharpness radius of the cutting edges 17 of the milling tool 2; and
- $D\lambda\gamma\alpha r_\beta$—a clearance wear of the cutting edges 17 of the milling tool 2.

$\lambda_t\ c_{p,t}\ \rho_t\lambda_w c_{p,w}\rho_w$ Furthermore, the set of input data 10 also comprises the set of additional parameters 11 which correspond to prerecorded data which are required for the calculations which the device 1 has to carry out. For example, these may be parameters which are intrinsic to the milling tool 2 and the workpiece 4 to be machined, such as features which are linked to their materials. Although these additional parameters 11 are intended to be taken into account in order to quantify the effects of the milling on the workpiece 4 to be machined, they cannot be modified. In a non-limiting manner, the additional parameters 11 may comprise:

- $\lambda_t\ c_{p,t}\ \rho_t\lambda_w c_{p,w}\rho_w$—a thermal conductivity of the milling tool 2;
- $\lambda_t\ c_{p,t}\ \rho_t\lambda_w c_{p,w}\rho_w$—a specific heat capacity of the milling tool 2;
- $\lambda_t\ c_{p,t}\ \rho_t\lambda_w c_{p,w}\rho_w$—a density of the milling tool 2;
- $\lambda_t\ c_{p,t}\ \rho_t\lambda_w c_{p,w}\rho_w$—a thermal conductivity of the workpiece 4 to be machined;
- $\lambda_t\ c_{p,t}\ \rho_t\lambda_w c_{p,w}\rho_w$—a specific heat capacity of the workpiece 4 to be machined; and
- $\lambda_t\ c_{p,t}\ \rho_t\lambda_w c_{p,w}\rho_w$—a density of the workpiece 4 to be machined.

The acquisition unit 16 is capable of providing at least some data from the set of input data 10 to other units of the device 1 in order to enable them to carry out calculations using these data.

Furthermore, the device 1 also comprises a first data-processing unit 19 (designated COMP1 in FIG. 1, "computation unit") which is capable of implementing the data-processing step E3 which has taken place after the milling step E2. The data-processing unit 19 is configured to determine the specific force coefficients 13 which are representative of the machining forces 12 applied to the master workpiece 4A during the reference milling operation (FIG. 8) which is carried out during the milling step E2.

In a preferred embodiment, the data-processing unit 19 is configured to determine the specific force coefficients 13 by integrating experimental results in theoretical expressions determined analytically. This is because, on the one hand, the machining forces 12 are measured experimentally during the reference milling of the milling step E2 and, on the other hand, theoretical machining forces are obtained by analytical calculations as explained below.

The reference milling, which is illustrated schematically in FIG. 8, corresponds to a conventional machining operation of the master workpiece 4A with the set of operating parameters 3. It involves machining a face 8A of the master workpiece 4A using the milling tool 2 in order to obtain a machined surface 5A. The advance of the milling tool 2 is illustrated by an arrow F1 and the rotation thereof is illustrated by an arrow F2.

During this reference milling, the values of the machining forces 12 applied by the milling tool 2 to the master workpiece 4A are measured. These values may be stored in a database (not illustrated) in order to be able to subsequently access them.

As illustrated schematically in FIG. 1, the device 1 comprises a dynamometric plate 20 which is capable of measuring the values of the machining forces 12 during the reference milling operation. In other embodiments, the device 1 may comprise other measuring tools which are capable of carrying out the measurements of the values of the machining forces 12.

Fx, Fy and Fz Three machining forces 12 ( ) are measured in the respective directions of three axes x, y and z which are illustrated in FIG. 8 and which form an orthogonal reference system R(x, y, z) as follows:

- Fx, Fy and Fz—the x axis is orientated perpendicularly to the machined surface 5A of the master workpiece 4A;
- Fx, Fy and Fz—the y axis is orientated in the advance direction of the milling tool 2 (arrow F1); and
- Fx, Fy and Fz—the z axis is orientated along the rotation axis of the milling tool 2 (arrow F2).

Furthermore, the data-processing unit 19 is configured to determine the theoretical machining forces which correspond to an analytical estimation of the machining forces 12 measured experimentally. In a specific embodiment, this estimation corresponds to the implementation of a sub-step E31 for analytical calculation of the data-processing step E3 as set out in detail below.

In this specific embodiment, the data-processing unit 19 comprises a kinematic mode which enables the establishment of mathematical expressions of the theoretical machining forces which are intended to be determined. These expressions are obtained from data of the set of input data 10 and other data calculated by the data-processing unit 19. They define relationships between the theoretical machining forces and the specific force coefficients 13 which it is desirable to determine.

The kinematic model of the reference milling is constructed by analytically isolating the work of each of the teeth 18 of the milling tool 2. In this manner, it is possible to determine local forces (for each of the teeth 18), then overall forces (sum of the local forces). This enables the notion of specific forces to be applied and thus the relationships which involve the specific force coefficients 13 to be made apparent.

Figure 5:
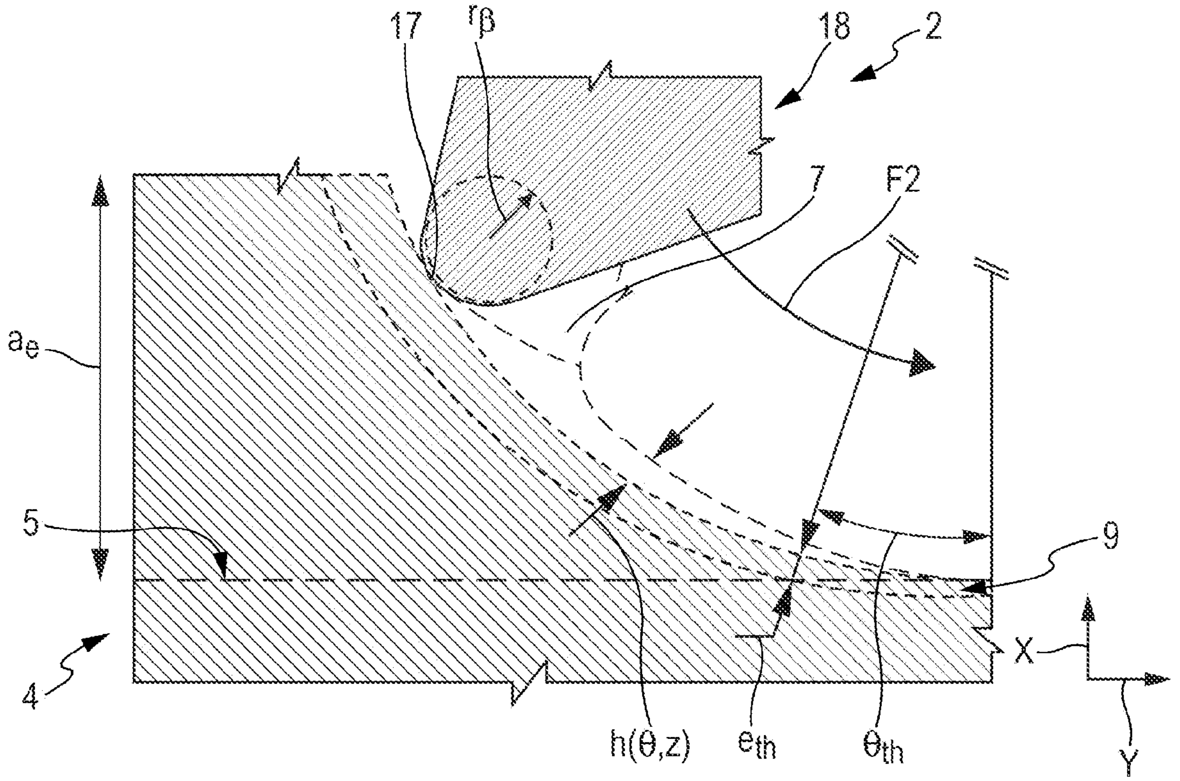
FIG. 5 shows an enlarged view of FIG. 4 detailing the generation of a chip by a cutting edge of the milling tool.
Figure 6:
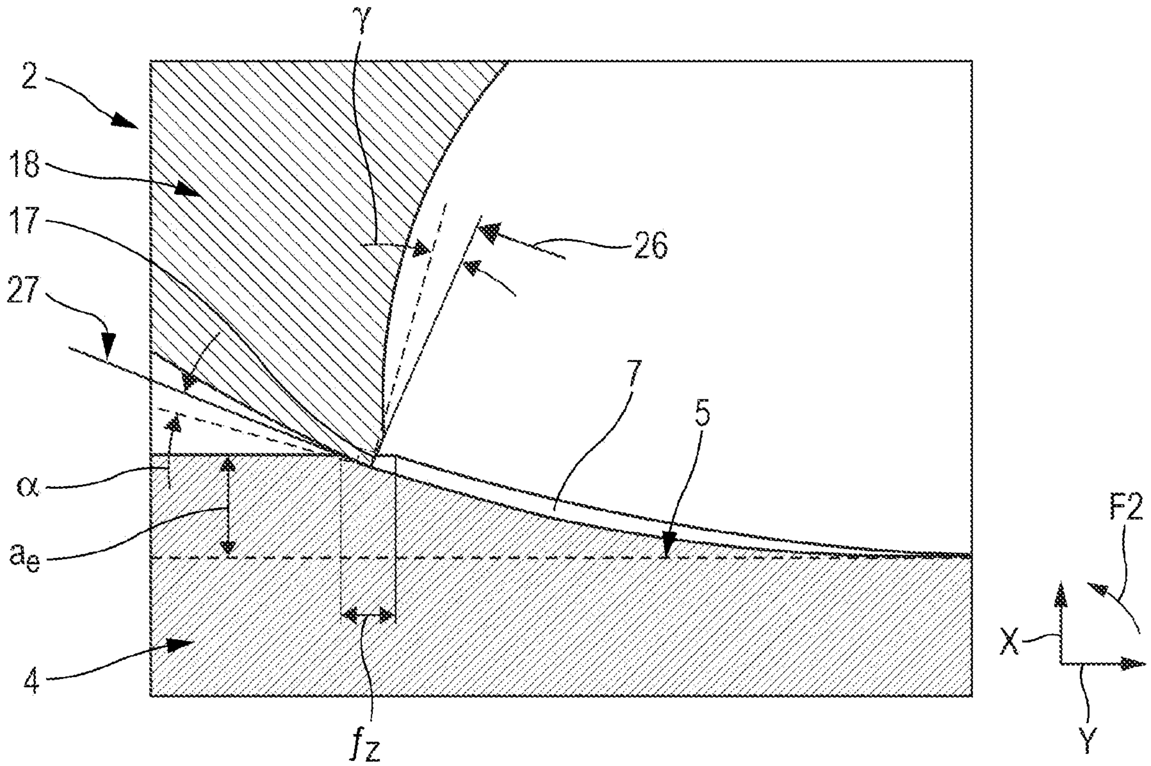
FIG. 6 shows a cross section of the interface between a cutting edge of the milling tool of FIG. 3 and the workpiece to be machined.
Figure 7:
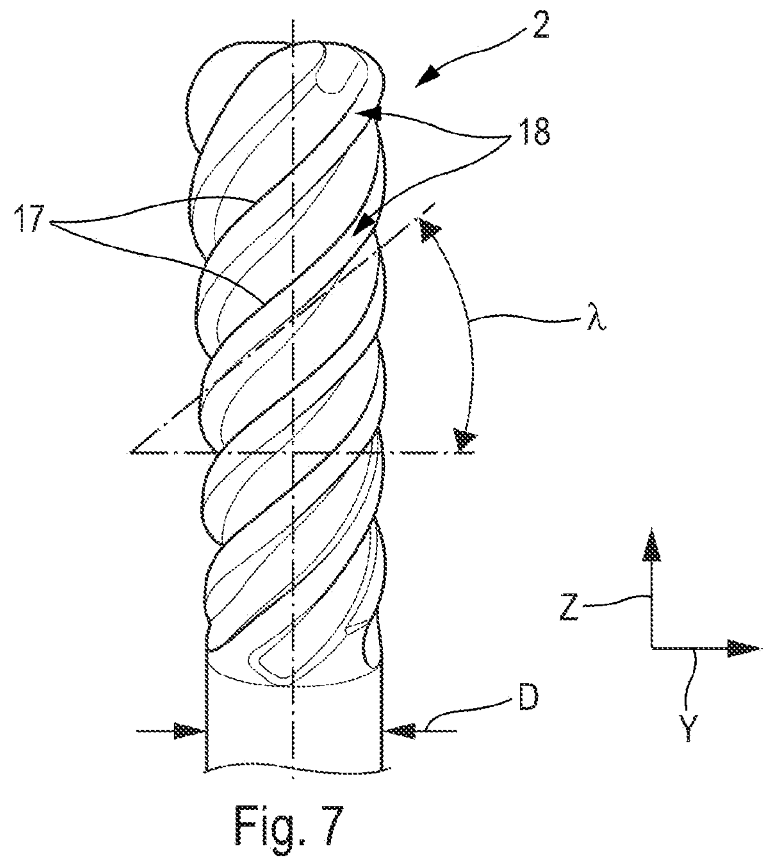
FIG. 7 shows a side view of a milling tool.

To this end, it is advantageous to calculate a non-cut thickness of a chip 7A which is produced by the milling tool 2 during the reference milling operation. This chip 7A corresponds to a chip which is cut by one of the teeth 18 of the milling tool 2 during a revolution thereof. Generally, as illustrated in FIG. 3 to FIG. 5, during a milling operation the thickness of the chip cut by a tooth (designated h(θ, z) in FIG. 5) varies in accordance with the axial position along the z axis (designated z) and the angular position about the z axis (designated θ). In this manner, during the reference milling operation, for each tooth 18 (designated with the index j) a non-cut thickness $h_j$ of the chip 7A is defined by the following equation:

$$h_j(\theta, z) = f_z \sin\theta_j(z)$$

where:

- j is a whole number between 1 and N (N being the number of teeth 18 of the milling tool 2);
- $f_z$ is the advance per tooth of the milling tool 2 (originating from the set of input data 10); and
- $\theta_j(z)$ is the angular position of the $j^{th}$ tooth 18, at an altitude designated z.

In order to calculate $\theta_j(z)$, a conventional discretization method is used in order to discretize the milling tool 2 into a whole number of elementary discs (designated $N_z$). The mean position along the z axis is thus defined by the following equation:

$$z(k) = (k-1)dz + \frac{dz}{2}$$

where k is a whole number between 1 and $N_z$.

The angular position of the $j^{th}$ tooth 18 $\theta_j(z)$ may thus be calculated by the following equation:

$$\theta_j(z) = \theta + (j-1)\theta_p - \left((k-1)dz + \frac{dz}{2}\right)\frac{\tan\lambda}{R}$$

where:

- θ is the angular position of the milling tool 2 from 0 to 2π;
- $\theta_p$ is the angle between two consecutive teeth 18 such that $$\theta_p = \frac{2\pi}{N}$$

where N is the number of teeth 18;

- λ is the helical angle of the milling tool 2 (originating from the set of input data 10); and
- R is the radius of the milling tool 2 (originating from the set of input data 10).

Elementary local forces (the tangential forces are designated dFt, the radial forces are designated dFr and the axial forces are designated dFa) may thus be expressed by the following equations, involving the specific force coefficients 13:

$$\begin{cases} dFt_j = [Kt_c h_j(\theta_j(z)) + Kt_e]dz \\ dFr_j = [Kr_c h_j(\theta_j(z)) + Kr_e]dz \\ dFa_j = [Ka_c h_j(\theta_j(z)) + Ka_e]dz \end{cases}$$

where:

- $Kt_c$ is the specific force coefficient for tangential cutting;
- $Kr_c$ is the specific force coefficient for radial cutting;
- $Ka_c$ is the specific force coefficient for axial cutting;
- $Kt_e$ is the specific force coefficient for the tangential edge;
- $Kr_e$ is the specific force coefficient for the radial edge; and
- $Ka_e$ is the specific force coefficient for the axial edge.

These local forces are expressed relative to the milling tool 2, therefore in a rotating reference system. They may be expressed in the orthogonal reference system R(x, y, z) (the forces along the x axis being designated dFx, the forces along the y axis being designated dFy and the forces along the z axis being designated dFz) by the following equations:

$$\begin{cases} dFx_j = -dFt_j\cos\theta_j(z) - dFr_j\sin\theta_j(z) \\ dFy_j = +dFt_j\sin\theta_j(z) - dFr_j\cos\theta_j(z) \\ dFz_j = +dFa_j \end{cases}$$

By adding together these elementary forces (over the entire milling tool 2), it is possible to obtain overall forces. The desired relationship which links the theoretical machining forces to the specific machining coefficients 13 is thus obtained. As a result of the knowledge of the machining forces 12 measured during the reference milling operation, it is then possible to identify each of the specific force coefficients 13.

To this end, the data-processing unit 19 carries out an identification sub-step E32 of the data-processing step E3. In particular, the data-processing unit 19 is configured to identify the specific force coefficients 13 by minimizing the deviation between the values of the machining forces 12 which have been measured beforehand and the values given by the theoretical machining forces.

Furthermore, the device 1 comprises a memory 21 in which the specific force coefficients 13 which have been identified in this manner are stored in order to be able to be subsequently used.

Preferably, the data-processing unit 19 is configured to carry out the identification of the specific force coefficients 13 using the least squares method. However, this identification may be carried out using other conventional regression methods.

Furthermore, the device 1 comprises a second data-processing unit 22 (designated COMP2 In FIG. 1) which is capable of implementing the data-processing step E5. The data-processing unit 22 is configured to calculate the final temperature $T_f$ from which it is possible to determine whether the set of operating parameters 3 has to be validated or rejected. The final temperature $T_f$ is obtained from the experimental values, specific force coefficients and data calculated by the data-processing unit 22 as set out in detail below. This is because the geometric sizes 14 are measured experimentally in the orthogonal cutting step E4 and the specific force coefficients are transmitted to the data-processing unit 22 by the memory 21.

The orthogonal cut which is illustrated in FIG. 9 to FIG. 11 corresponds to a cut of the master workpiece 4B in a specific configuration where the cutting edge 17 of the milling tool 2 is rectilinear and perpendicular to the direction given by the advance of the milling tool 2. The direction of advance of the milling tool 2 is illustrated by an arrow F3 in FIG. 9. This orthogonal cut involves machining the master workpiece 4B in the region of a face 8B in order to obtain the machined surface 5B. The objective of the orthogonal cut is to cut the reference chip 7B which acts as an experimental sample on which the values of the geometric sizes 14 are carried out.

As illustrated schematically in FIG. 1, the device 1 comprises a measurement unit 23 which is configured to measure the values of the geometric sizes 14 which are linked to the reference chip 7B during the orthogonal cut. These values may be recorded in a memory (not illustrated) in order to be able to be subsequently used. Preferably, the measurement unit 23 is capable of carrying out measurements of the optical type. In other embodiments, however, the measurement unit 23 may be capable of carrying out measurements of other types. Furthermore, these measurements may be carried out directly during the orthogonal cut or afterwards.

The contact of the milling tool 2 with a face 8B of the master workpiece 4B brings about a significant compression of the material which generates a shearing at the start of the formation of the reference chip 7B. This shearing is produced in a primary shearing zone A1 which is defined between a tip 24 of the milling tool 2 and an outer surface 25 of the reference chip 7B (FIG. 10). The reference chip 7B formed in this manner rubs on a cutting face 26 of the milling tool 2 in the region of a secondary shearing zone A2. A clearance face 27 of the milling tool 2 rubs, at least partially, against the machined surface 5B of the master workpiece 4B in the region of a tertiary shearing zone A3.

$\Phi_n L_c L_a h_c$ In a preferred embodiment, the geometric sizes 14 measured by the measurement unit 23 comprise the following sizes which are illustrated in FIG. 10:

- $\Phi_n L_c L_a h_c$—an inclination angle of the primary shearing plane;
- $\Phi_n L_c L_a h_c$—a contact length of the chip on the cutting face;
- $\Phi_n L_c L_a h_c$—a clearance contact length; and
- $\Phi_n L_c L_a h_c$—a mean thickness of the cut chip.

Furthermore, the data-processing unit 22 is capable of implementing the calculation sub-step E51. It is configured to calculate the tertiary thermal flux $Q_\alpha$ (FIG. 11) which is generated during the orthogonal cut in the tertiary shearing zone A3. To this end, the data-processing unit 22 uses data from the set of input data 10 of the values of the geometric sizes 14 measured during the orthogonal cut. The tertiary thermal flux $Q_\alpha$ is defined by the following equation:

$$Q_\alpha = \frac{P_\alpha}{b \cdot L_a}$$

where:

- $P_\alpha$ is the power generated by friction in the region of the clearance face 27 of the milling tool 2 (with $P_\alpha = K_{te} \cdot b \cdot v_c$);
- b is the width of the master workpiece 4B (that is to say, the dimension thereof along the z axis); and
- $L_\alpha$ is the clearance contact length.

Furthermore, the data-processing unit 22 is capable of implementing the calculation sub-step E52. It is configured to calculate the final temperature $T_f$ generated by the milling tool 2 in the region of the machined surface 5B. In a specific embodiment, it is considered that the final temperature $T_f$ is generated only by the tertiary thermal flux $Q_\alpha$.

The final temperature $T_f$ can be calculated by applying the continuity principle, in the region of the interface between the milling tool 2 and the machined surface 5B, between a temperature $T_{outil}$ of the milling tool 2 and a temperature $T_{surf}$ of the machined surface 5B.

The temperature $T_{outil}$ is defined by the following equation:

$$T_{outil}(x, t_c) = T_{amb} + \frac{Q_a \cdot \sqrt{\alpha_t t_c}}{\lambda\sqrt{\pi}} \left\{ -\mathrm{erf}\left(\frac{(a+x)}{2\sqrt{\alpha_t \cdot t_c}}\right) + \mathrm{erf}\left(\frac{(x-a)}{2\sqrt{\alpha_t \cdot t_c}}\right) - \frac{(a+x)}{2\sqrt{\alpha_t \cdot t_c}} ei\left(\frac{(a+x)^2}{4\alpha_t \cdot t_c}\right) + \frac{(x-a)}{2\sqrt{\alpha_t \cdot t_c}} ei\left(\frac{(x-a)^2}{4\alpha_t \cdot t_c}\right) \right\}$$

where:

x is the position along the x axis;

$t_c$ is the time of the cutting edge in terms of material such that $$t_c = \frac{L_{ch}}{v_c};$$

$L_{ch}$ is the length of the reference chip 7B such that $$L_{ch} = R\mathrm{acos}\left(1 - \frac{a_e}{R}\right);$$

$T_{amb}$ is the ambient temperature;

$\alpha_t$ is the thermal diffusivity of the material of the milling tool 2;

a is the semi-length of clearance contact $$\left(a = \frac{L_a}{2}\right);$$

and ei is the integral exponential function such that $$ei(x) = \int_{-\infty}^{x} \frac{e^t}{c} dt.$$

It is thus possible to calculate a mean temperature as follows:

$$T_{outil}^{moy}(t_c) = \int_{-a}^{a} \frac{T_{outil}(x, t_c)}{L_\alpha} dx$$

Furthermore, the temperature $T_{surf}$ is defined by the following equation:

$$T_{surf} = T_{amb} + 2 \cdot \frac{Q_\alpha}{\pi \cdot v_c \cdot \rho \cdot c_{p,w}} \cdot \left\{(X+L)e^{-(X+L)}\left[K_0\left((X+L)e^{-(X+L)}\right) - K_1\left((X+L)e^{-(X+L)}\right)\right] - (X-L)e^{-(X-L)}\left[K_0\left((X-L)e^{-(X-L)}\right) - K_1\left((X-L)e^{-(X-L)}\right)\right]\right\}$$

where:

$K_0$ and $K_1$ are predetermined coefficients;

$$X = \frac{v_c \cdot x}{2\alpha_w};$$

$$L = \frac{v_c \cdot a}{2\alpha_w};$$

and $\alpha_w$ is the thermal diffusivity of the material of the master workpiece 4B.

It is thus possible to calculate a mean temperature as follows:

$$T_{surf}^{moy}(t_c) = \int_{-a}^{a} \frac{T_{surf}(x)}{L_\alpha} dx$$

The continuity condition between the temperature $T_{outil}$ and the temperature $T_{surf}$ is reflected as the equality of the temperatures $T_{outil}$ and $T_{surf}$. If this equality is transposed in terms of the thermal fluxes absorbed by the milling tool 2 and by the machined surface 5B, the following equation is obtained:

$$T_{outil} = T_{surface} = a^* \cdot Q_{outil} = b^* \cdot Q_{surf}$$

where:

$$a^*(t) = \frac{1}{Q_\alpha} \int_{-a}^{a} \frac{T_{surf}}{2a} dx;$$

$$b^*(t) = \frac{1}{Q_\alpha} \int_{-a}^{a} \frac{T_{outil}}{2a} dx;$$

$$Q_{surf} = \eta_{surf} \cdot Q_a;$$

$$Q_{outil} = \eta_{outil} \cdot Q_a;$$

$$\eta_{surf} = 1 - \eta_{outil};$$

$$\text{and } \eta_{outil} = \frac{a^*}{a^* + b^*}$$

The data-processing unit 22 is thus capable of calculating the final temperature which is defined by the following equation:

$$T_f = a^* \cdot Q_{surf}$$

Furthermore, the data-processing unit 22 is also capable of comparing the final temperature $T_f$ with the critical temperature $T_c$ and deciding whether the set of operating parameters 3 has to be validated or rejected. If the final temperature $T_f$ is greater than or equal to the critical temperature $T_c$, the set of operating parameters 3 is thus rejected. If the final temperature $T_f$ is lower than the critical temperature $T_c$, the set of operating parameters 3 is thus validated.

In a specific embodiment, the device 1 further comprises a third data-processing unit 28 (designated COMP3 in FIG. 1) which is capable of implementing the data-processing step E6. The data-processing unit 28 is configured to calculate the total temperature $T_t$ which corresponds to the temperature in the region of the machined surface 5B of the master workpiece 4B during the orthogonal cut. This calculation of the total temperature $T_t$ takes into account, in addition to the contribution of the tertiary thermal flux $Q_\alpha$, the contributions of the primary thermal flux $Q_s$ and the secondary thermal flux $Q_\gamma$. The contributions of the various thermal fluxes are illustrated in FIG. 11 by arrows Q1 (for the primary thermal flux $Q_s$), Q2 (for the secondary thermal flux $Q_\gamma$) and Q3 (for the tertiary thermal flux $Q_\alpha$) illustrating the heat diffusions.

The data-processing unit 28 is configured to calculate the primary thermal flux $Q_s$ generated in the primary shearing zone A1 and the secondary thermal flux $Q_\gamma$ generated in a secondary shearing zone A2 during the orthogonal cut. This calculation is carried out on the basis of some data from the set of input data 10 and the values of the geometric sizes 14 measured during the orthogonal cut.

The primary thermal flux $Q_s$ is defined by the following equation:

$$Q_s = \frac{P_s}{A_s}$$

where:

$P_s$ is the power on the primary shearing plane A1 such that $P_s = F_s \cdot v_s$;

$F_s$ is the shearing force in the primary shearing plane such that $$F_s = Ft_c \cdot \cos\Phi_n - Fr_c \cdot \sin\Phi_n;$$

$v_s$ is the shearing speed in the primary shearing plane A1, such that $$v_s = v_c \cdot \frac{\cos\gamma}{\cos(\Phi_n - \gamma)};$$

$Ft_c$ is the tangential cutting force such that $Ft_c = b \cdot Kt_c \cdot h_{th}$;

$Fr_c$ is the radial cutting force such that $Fr_c = b \cdot Kr_c \cdot h_{th}$; and $h_{th}$ is a non-cut thermal chip thickness.

The thickness of the non-cut thermal chip $h_{th}$, illustrated in FIG. 4, corresponds to the value of the thickness of the non-cut chip such that the tooth of the milling tool 2 which is in the process of cutting the chip is located in a thermal angular sector. This thermal angular sector having a thermal angle of $\theta_{th}$ corresponds to the angular range for which the milling tool 2 thermally affects the machined surface 5 of the workpiece 4 to be machined. The thermal angular sector relates only to the last portion of the angular range where the tooth of the milling tool 2 machines the workpiece 4 to be machined.

The thickness of the non-cut thermal chip is defined by the following equation:

$$h_{th} = R + f_z \sin\theta_{th} - \sqrt{R^2 - (f_z \cos\theta_{th})^2}$$

where:

$\theta_{th}$ is the thermal angle such that $$\theta_{th} = \operatorname{asin}\left(\frac{\sqrt{e_{th}} \cdot \sqrt{e_{th} + 2R}}{R + e_{th}}\right);$$

$e_{th}$ is the thickness of the thermal information item transmitted in the region of the machined surface 5 such that $e_{th} = \sqrt{\alpha_w \cdot t_c}$.

Furthermore, the secondary thermal flux $Q_\gamma$ is defined by the following equation:

$$Q_\gamma = \frac{P_\gamma}{b \cdot L_c}$$

where:

$P_\gamma$ is the friction power on the cutting face 26 of the milling tool 2 such that $P_\gamma = Ft_\gamma \cdot v_{ch}$;

$Ft_\gamma$ is the tangential force on the cutting face 26 such that $$Ft_\gamma = Ft_c \cdot \sin\gamma_n + Fr_c \cdot \cos\gamma_n;$$

$Ft_c$ is the tangential cutting force such that $Ft_c = b \cdot Kt_c \cdot h_{th}$;

$Fr_c$ is the radial cutting force such that $Fr_c = b \cdot Kr_c \cdot h_{th}$; and $v_{ch}$ is the mean speed of the chip on the cutting face 26 such that $$v_{ch} = v_c \cdot \frac{h_{th}}{h_c}.$$

The data-processing unit 28 is also configured to calculate the total temperature $T_t$ taking into account the contributions of the primary thermal flux $Q_s$ and the secondary thermal flux $Q_\gamma$. In order to take into account these contributions, it is capable of calculating the temperature, in the primary shearing plane and in the secondary shearing plane, respectively, and applying, by addition, a portion of these temperatures to the final temperature $T_f$, which has been previously calculated by the data-processing unit 22.

For example, it is possible to calculate the temperature in the primary shearing plane using the following equation:

$$T_s = T_{amb} + \eta \cdot \left(\frac{P_s}{b \cdot h_{th} \cdot v_c \cdot \rho_w \cdot c_{p,w}(T_{amb})}\right)$$

where $\eta$ is a known value which represents the proportion of plastic power which is transformed into heat.

And it is possible to calculate the portion of this heat which is applied to the machined surface 5B using the following equation:

$$p = 1 - \left(\frac{1}{1 + 1.328\left(\frac{\alpha_w \cdot \gamma_s}{v_c \cdot h_{th}}\right)}\right)$$

where $\gamma_s$ is the mean deformation in the primary shearing plane A1, such that $\gamma_s =$ $$\frac{\cos\gamma}{\sin\Phi_n \cos(\Phi_n - \gamma)}.$$

A similar reasoning is applied to calculate the contribution of the secondary thermal flux $Q_\gamma$.

Furthermore, the data-processing unit 28 is configured to compare the total temperature $T_t$ with the critical temperature $T_c$. If the total temperature $T_t$ is greater than or equal to the critical temperature $T_c$, the set of operating parameters 3 is thus rejected. If the total temperature $T_t$ is lower than the critical temperature $T_c$, the set of operating parameters 3 is thus validated.

The data-processing unit 22 and the data-processing unit 28 are configured to transmit a set of output data 29 to a device (not illustrated) which is provided to receive it. This may simply be a value of the binary type which indicates whether the set of operating parameters 3 is validated or rejected, for example, via a display screen for an operator. These may also be data which comprise, for example, in addition to the value indicating whether the set of operating parameters 3 is validated or rejected, the set of operating parameters 3, the final temperature $T_f$ and/or the total temperature $T_t$. The set of output data 29 can thus be processed automatically by a processing unit which is provided for this purpose, or manually by an operator.

In an example of application of the device 1, the method P is implemented in order to determine a set of functional operating parameters, that is to say, a set of operating parameters which is validated by the method P. However, it may also be implemented in order to optimize a machining operation by finding the best set of operating parameters 3, that is to say, the set which maximizes the material health of the workpiece 4 to be machined and the productivity of the machining operation. This optimization can be carried out using the method P in an iterative manner, changing at least one parameter of the set of operating parameters 3 with each iteration until a desired machining operation is obtained. This iteration can be carried out manually by an operator or automatically by an algorithm provided for this purpose.

The method P implemented by the device 1 as described above has a number of advantages. In particular:

- it enables the maximum temperature generated on the workpiece 4 to be machined in the region of the machined surface 5 to be estimated easily and rapidly;
- it enables it to be determined easily and rapidly whether the set of operating parameters 3 has to be validated or rejected in accordance with a simple criterion;
- it enables it to be known whether it is necessary to adapt the set of operating parameters 3 in order to be able to maximize the material health of the workpiece 4 to be machined; and
- it enables it to be known whether it is necessary to adapt the set of operating parameters 3 in order to be able to maximize the productivity of a milling operation.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for validating a set of operating parameters of a machine tool, the machine tool comprising a milling tool to carry out a milling operation of a workpiece to be machined, the method comprising at least a series of steps of:

- an acquisition step which involves acquiring a set of input data comprising at least:
  - a set of operating parameters to be validated, comprising parameters which are linked to the machine tool and parameters which are linked to the milling tool; and
  - a set of additional parameters relating to features of the milling tool and the workpiece to be machined;
- a milling step which involves producing, using the milling tool, at least one reference milling of a first master workpiece which is representative of the workpiece to be machined, and measuring values of machining forces which are applied by the milling tool to the first master workpiece;
- a first data-processing step which involves determining, from at least some data of the set of input data and the values of the machining forces measured in the milling step, specific force coefficients which are representative of the machining forces;
- an orthogonal cutting step which involves carrying out, using the milling tool, at least one orthogonal cut of a second master workpiece which is representative of the workpiece to be machined, and measuring at least values of geometric sizes which are linked to a reference chip which is generated during the orthogonal cut; and
- a second data-processing step comprising at least:
  - a first calculation sub-step which involves calculating, from at least some data from the set of input data, at least one of the specific force coefficients and the values of the geometric sizes measured in the orthogonal cutting step, a tertiary thermal flux which is generated in a tertiary shearing zone of the second master workpiece during the orthogonal cut;
  - a second calculation sub-step which involves calculating, from the tertiary thermal flux, a final temperature which is representative of a maximum temperature in a region of a machined surface of the second master workpiece during the orthogonal cut; and
  - a comparison sub-step which involves comparing the final temperature with a critical temperature and:
    - rejecting the set of operating parameters if the final temperature is greater than or equal to the critical temperature; and
    - validating the set of operating parameters if the final temperature is lower than the critical temperature.

2. The method of claim 1, wherein the set of operating parameters comprises at least some of operating parameters of:

- an advance speed of the milling tool;
- a rotation frequency of the milling tool;
- a cutting speed of the milling tool;
- an advance per tooth of the milling tool;
- a radial engagement of the milling tool;
- an axial engagement of the milling tool;
- a diameter of the milling tool;
- a number of teeth of the milling tool;
- a helix angle of the milling tool;
- a cutting angle of cutting edges of the milling tool;
- a clearance angle of the cutting edges of the milling tool;
- a sharpness radius of the cutting edges of the milling tool; and
- a clearance wear of the cutting edges of the milling tool.

3. The method of claim 1, wherein the first data-processing step comprises:

- an analytical calculation sub-step which involves determining, from a kinematic model of the reference milling carried out in the milling step, mathematical expressions of the theoretical machining forces as a function of the specific force coefficients; and
- an identification sub-step which involves identifying the specific force coefficients by minimizing deviations between the values of the machining forces measured in the milling step and the theoretical machining forces.

4. The method of claim 1, wherein the orthogonal cutting step involves measuring the values of at least some of geometric sizes of:

- an inclination angle of the primary shearing plane;
- a chip contact length on the cutting face;
- a clearance contact length; and
- a mean thickness of the cut chip.

5. The method of claim 1, comprising a third data-processing step implemented after the second data-processing step if the final temperature is lower than the critical temperature, the third data-processing step comprising:

- a third calculation sub-step involving calculating, from at least some data of the set of input data and values of the geometric sizes measured in the orthogonal cutting step, a primary thermal flux which is generated in a primary shearing zone of the second master workpiece, and a secondary thermal flux which is generated in a secondary shearing zone of the second master workpiece;
- a fourth calculation sub-step which involves calculating, from the primary thermal flux and the secondary thermal flux, a total temperature which is representative of the maximum temperature in the region of a machined surface of the second master workpiece during the orthogonal cut; and
- a comparison sub-step which involves comparing the total temperature with the critical temperature and:
  - rejecting the set of operating parameters if the total temperature is greater than or equal to the critical temperature; and
  - validating the set of operating parameters if the total temperature is lower than the critical temperature.

6. A device for validating a set of operating parameters of a machine tool, the machine tool comprising a milling tool to carry out a milling operation of a workpiece to be machined, the device comprising at least:

- receiver configured to receive a set of input data comprising at least:
  - a set of operating parameters to be validated, comparing parameters which are linked to the machine tool and parameters which are linked to the milling tool; and
  - a set of additional parameters relating to features of the milling tool and the workpiece to be machined;
- a first processing circuit configured to determine, from the set of input data and values of machining forces, specific force coefficients which are representative of the machining forces, the values of the machining forces corresponding to force values applied by the milling tool to a first master workpiece, which is representative of the workpiece to be machined, during a reference milling of the first master workpiece;

a second processing circuit configured:

to calculate, from at least some data from the set of input data, at least one of the specific force coefficients and values of geometric sizes, a tertiary thermal flux which is generated in a tertiary shearing zone, the values of the geometric sizes corresponding to values which are linked to a reference chip of a second master workpiece which is generated by the milling tool during an orthogonal cut of the second master workpiece;

to calculate, from the tertiary thermal flux, a final temperature which is representative of a maximum temperature in the region of a machined surface of the second master workpiece during the orthogonal cut; and to compare the final temperature with a critical temperature and:

to reject the set of operating parameters if the final temperature is greater than or equal to the critical temperature; and to validate the set of operating parameters if the final temperature is lower than the critical temperature.

7. The device of claim 6, comprising a third processing circuit configured:

to calculate, from at least some data from the set of input data and values of the geometric sizes measured during the orthogonal cut, a primary thermal flux which is generated in a primary shearing zone of the second master workpiece, and a secondary thermal flux which is generated in a secondary shearing zone of the second master workpiece;

to calculate, from the primary thermal flux and the secondary thermal flux, a total temperature which is representative of the maximum temperature in the region of a machined surface of the second master workpiece during the orthogonal cut; and to compare the total temperature with the critical temperature and:

to reject the set of operating parameters if the total temperature is greater than or equal to the critical temperature; and to validate the set of operating parameters if the total temperature is lower than the critical temperature.

8. The device of claim 6, comprising a dynamometric plate which is configured to measure the values of the machining forces during the reference milling of the first master workpiece.

9. The device of claim 6, comprising a measurement circuit which is configured to carry out optical measurements of the geometric sizes during the orthogonal cut of the second master workpiece.

* * * * *